United States Patent
Good

(10) Patent No.: US 11,038,864 B2
(45) Date of Patent: Jun. 15, 2021

(54) SYSTEMS AND METHODS FOR CUSTOMER SERVICE ACCESS TO A CONSUMER INTERFACE SYSTEM

(71) Applicant: MasterCard International Incorporated, Purchase, NY (US)

(72) Inventor: William John Good, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1102 days.

(21) Appl. No.: 14/303,114

(22) Filed: Jun. 12, 2014

(65) Prior Publication Data

US 2015/0365387 A1 Dec. 17, 2015

(51) Int. Cl.
*H04L 29/06* (2006.01)

(52) U.S. Cl.
CPC .................................. *H04L 63/08* (2013.01)

(58) Field of Classification Search
CPC ................................. H04L 63/08; H04L 67/20
USPC ........................................................ 705/304
See application file for complete search history.

(56) References Cited

U.S. PATENT DOCUMENTS

| | | | |
|---|---|---|---|
| 5,448,633 A | 9/1995 | Jamaleddin et al. | |
| 6,122,632 A | 9/2000 | Botts et al. | |
| 6,404,884 B1 | 6/2002 | Marwell et al. | |
| 6,668,055 B2 | 12/2003 | Marwell et al. | |
| 7,275,046 B1 * | 9/2007 | Tritt | G06Q 20/102 705/36 R |
| 7,433,457 B2 | 10/2008 | Marwell et al. | |
| 7,634,565 B2 | 12/2009 | Goffin | |
| 2004/0177319 A1 * | 9/2004 | Horn | G06F 16/22 715/205 |
| 2006/0031077 A1 * | 2/2006 | Dalton | G06Q 30/02 702/27 |
| 2007/0209041 A1 * | 9/2007 | Exley | G06F 9/541 719/328 |
| 2007/0226319 A1 | 9/2007 | Laszakovits | |
| 2007/0226358 A1 * | 9/2007 | Krywaniuk | H04L 41/00 709/229 |
| 2008/0097850 A1 * | 4/2008 | Kristal | G06Q 30/02 705/14.27 |
| 2010/0061542 A1 | 3/2010 | Marwell et al. | |
| 2010/0159902 A1 * | 6/2010 | Roundtree | G06F 9/45512 455/414.1 |
| 2012/0102004 A1 * | 4/2012 | Johnson | G11B 27/034 707/692 |

(Continued)

FOREIGN PATENT DOCUMENTS

WO   WO-0077707 A1 * 12/2000 ............. G06Q 40/02

*Primary Examiner* — Jerry O'Connor
*Assistant Examiner* — James Webb
(74) *Attorney, Agent, or Firm* — Armstrong Teasdale LLP

(57) ABSTRACT

A computer-based method for providing a customer service representative (CSR) access to an interface system uses a computing device including a processor and a memory. The method includes receiving, by the processor, an authentication request including a CSR identifier associated with the CSR. The method also includes identifying, in the memory, a customer identifier using at least the CSR identifier. The method further includes transmitting an authentication response in response to the authentication request. The authentication response includes at least the customer identifier.

19 Claims, 9 Drawing Sheets

(56) References Cited

U.S. PATENT DOCUMENTS

| | | | |
|---|---|---|---|
| 2012/0216268 A1* | 8/2012 | Kassaei | H04L 9/3234 |
| | | | 726/9 |
| 2013/0054306 A1* | 2/2013 | Bhalla | G06Q 30/02 |
| | | | 705/7.31 |
| 2014/0115113 A1* | 4/2014 | Paxinos | H04L 41/04 |
| | | | 709/219 |
| 2015/0059006 A1* | 2/2015 | White | G06F 21/6236 |
| | | | 726/30 |

* cited by examiner

SYSTEMS AND METHODS FOR CUSTOMER SERVICE ACCESS TO A CONSUMER INTERFACE SYSTEM

BACKGROUND OF THE DISCLOSURE

This disclosure relates generally to customer service systems and, more specifically, to systems and methods for enabling customer service representatives to access a consumer interface system by assuming the identity of the consumer.

Some issuers of payment cards, such as credit cards, provide a loyalty program to their customers (i.e., cardholders), through which cardholders may accumulate various "loyalty" rewards. As cardholders use their payment cards, loyalty points or other offers accumulate on behalf of the cardholder. These loyalty rewards may be spent or otherwise redeemed by the cardholder for various goods and services. Some known systems provide a database that maintains loyalty rewards data associated with cardholders. Further, some known systems may provide an Internet-accessible customer-facing application (e.g., a "rewards system") in which the cardholder can log in and manage their loyalty program through a consumer environment or "consumer experience." Through the rewards system, a cardholder may, for example, view their accumulated loyalty points or other offers, or may spend their loyalty points on goods or services.

A customer support service (CSS) application may be provided to manage aspects of the loyalty program. For example, a cardholder may wish to spend their loyalty points on a particular good or service, but may not have access to the rewards system. The user may telephone a customer service representative (CSR) to assist with aspects of management of their accumulated rewards. In some known systems, the CSS application may have access to data about the loyalty program, but the CSS application may not provide access to the tools, utilities, or features that are available to the cardholder through the consumer experience. As such, the CSR is left with a limited ability to assist the cardholder. In other systems, the CSS application may have access to data about the loyalty program, but the CSS application cannot record or track the CSR's access to the loyalty data. As such, the CSR is unable to document requests made by the user with respect to the loyalty program.

BRIEF DESCRIPTION OF THE DISCLOSURE

In one aspect, a computer-based method for providing a customer service representative (CSR) access to an interface system is provided. The method uses a computing device including a processor and a memory. The method includes receiving, by the processor, an authentication request including a CSR identifier associated with the CSR. The method also includes identifying, in the memory, a customer identifier using at least the CSR identifier. The method further includes transmitting an authentication response in response to the authentication request. The authentication response includes at least the customer identifier.

In another aspect, a computing device for providing a customer service representative (CSR) access to an interface system is provided. The computing device includes a processor communicatively coupled to a memory. The computing device is programmed to receive an authentication request including a CSR identifier associated with the CSR. The computing device is also programmed to identify a customer identifier using at least the CSR identifier. The computing device is further programmed to transmit an authentication response in response to the authentication request. The authentication response includes at least the customer identifier.

In yet another aspect, at least one non-transitory computer-readable storage media having computer-executable instructions embodied thereon is provided. When executed by at least one processor, the computer-executable instructions cause the processor to receive an authentication request including a customer service representative (CSR) identifier associated with a CSR. The computer-executable instructions also cause the processor to identify a customer identifier using at least the CSR identifier. The computer-executable instructions further cause the processor to transmit an authentication response in response to the authentication request. The authentication response includes at least the customer identifier.

BRIEF DESCRIPTION OF THE DRAWINGS

FIG. 1 is a schematic diagram illustrating an example multi-party transaction card industry system for authorizing payment card transactions, and in which a cardholder may participate in a loyalty rewards program.

FIG. 2 is a simplified block diagram of an example computing system for providing a loyalty rewards program to cardholders.

FIG. 3 is an expanded block diagram of an example embodiment of a server architecture of a loyalty rewards system including the plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 is an example loyalty network environment that may be implemented by loyalty rewards system shown in FIG. 3 in which a customer service representative (CSR) may cross-authenticate into a customer environment to provide customer support.

FIG. 7 is an example loyalty network or system and method that may be used to provide a loyalty program to cardholders.

FIG. 8 is an example method for supporting a loyalty program for cardholders in a loyalty network such as shown in FIG. 7.

FIG. 9 shows an example configuration of a database within a computing device, along with other related computing components, that may be used to cross-authenticate a CSR from the CSS system shown in FIG. 7 into the rewards system shown in FIG. 7 as a particular customer.

DETAILED DESCRIPTION OF THE DISCLOSURE

Figure 1:
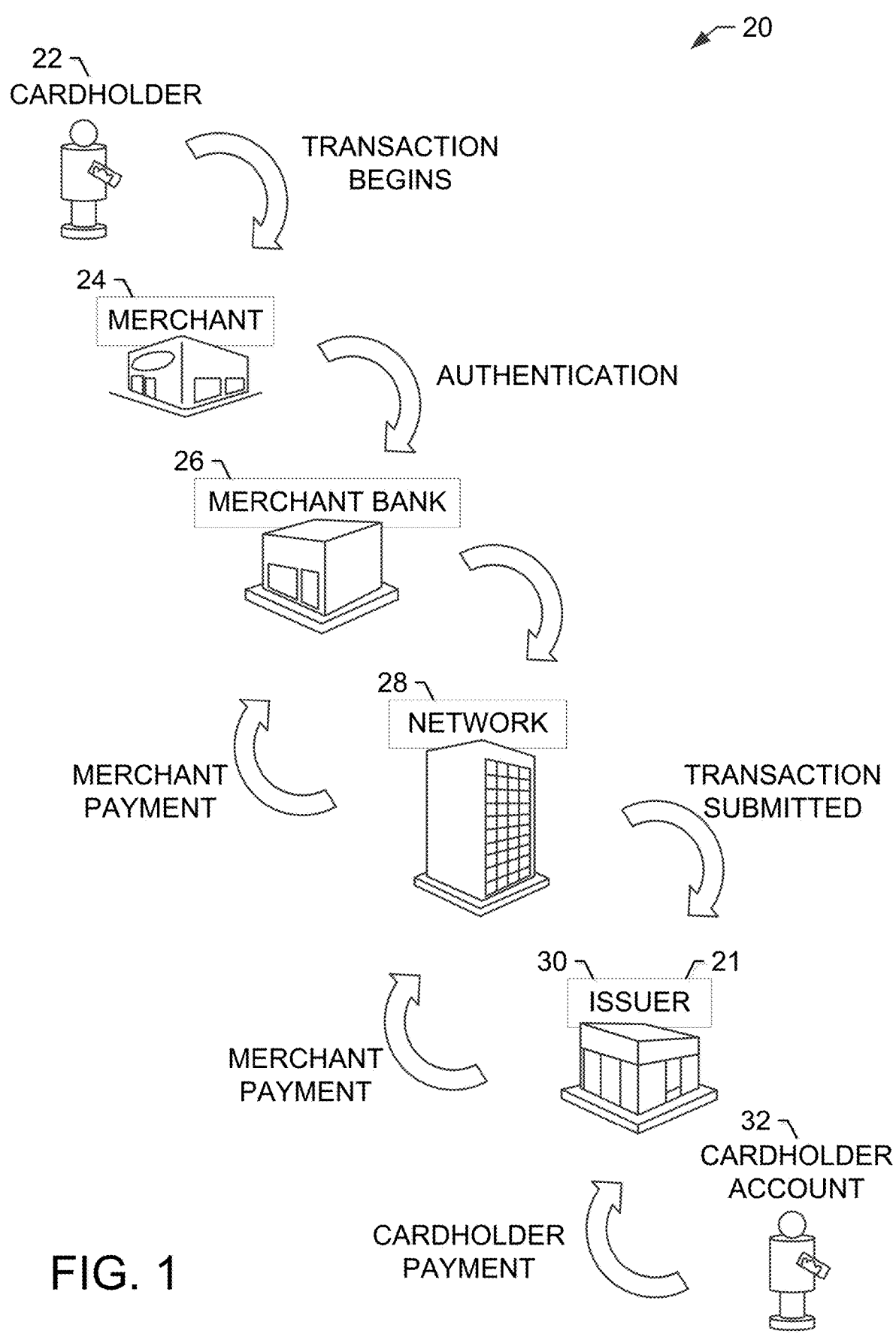
FIGS. 1-9 show example embodiments of the methods and systems described herein.

Systems and methods are described herein for providing customer service access to an online consumer environment (also referred to herein as an "interface system" or a "customer interface system"). More specifically, the systems and methods described herein enable a customer service representative (CSR) the ability to access an interface system, such as a rewards system, as the consumer. For example, an issuer of payment cards and/or a payment processor may provide a loyalty program to their consumers (e.g., the cardholders). The loyalty program provides rewards to the cardholders based on, for example, a volume or regularity of use of their payment card. These rewards are associated with a particular cardholder's rewards account within a loyalty program database.

A rewards system is provided that enables the cardholder to login and manage their accumulated rewards and other benefits associated with the loyalty program. This rewards system may be, for example, an Internet-accessible application that provides various functionalities to the cardholder. This application provides a consumer environment or a "consumer experience" that may be distinctly customized for each individual cardholder.

A customer support service (CSS) system and application are also provided. The CSS system is accessed by a CSR while providing support services for cardholders in need of assistance with aspects of the loyalty program. In one example embodiment, the CSS system has access to the loyalty program database, but has only a limited set of functionality. In other words, the CSS system does not enable the CSR to perform an operation on behalf of the cardholder that is available to the cardholder through the rewards system (i.e., through the "consumer experience").

In the systems and methods described herein, the system includes an authentication cross-over module (or just "authentication module") is provided. The authentication module enables the CSR to "cross over" into, or log into, the consumer experience of the rewards system during a support call. More specifically, the authentication module allows the CSR to authenticate into the rewards system as the cardholder, thereby allowing the CSR to perform functionality within the rewards system as the cardholder using the same application and view that the cardholder would see.

For example, a cardholder (e.g., CUSTOMER_ID="98765") initiates a support call with a CSR (e.g., "CSR #55"). The CSR is logged into the CSS system using his own identifier (ID) (e.g., "CSR_55"), referred to herein as a support ID. The CSS system provides a link for the CSR to launch the consumer experience. When the CSR activates the link, the authentication module creates and stores a record of the support association (e.g., that CSR_55 is currently and actively assisting cardholder "98765") in a customer mapping database. The authentication module then initiates a login process with the rewards system (i.e., the same system that the cardholder would access) using the CSR's credentials (e.g., "CSR_55"), not the cardholder's credentials. In addition, the login process includes a flag (referred to herein as a "CSR flag") indicating that a CSR is making the login request, rather than a cardholder.

The rewards system accesses the authentication module to authenticate the incoming user (e.g., CSR_55). The authentication module recognizes the presence of the CSR flag and attempts to authenticate the login request as a CSR attempt to access a cardholder's consumer experience. More specifically, the authentication module accesses the customer mapping database and looks for a row associated with CSR_55. The row that was inserted earlier in this process is found, and the cardholder "98765" is identified as the cardholder being assisted by CSR #55. As such, the authentication module completes the authentication process, but does not provide the CSR_55 authentication information. Rather, the authentication module completes the authentication process as cardholder "98765." As such, the CSR is presented with the cardholder's consumer experience, effectively logging the CSR into the rewards system as the cardholder without requiring knowledge of the customer's password. Further, this approach may be used with some existing infrastructure with minimal changes to existing authentication mechanisms.

A technical effect of the systems and processes described herein include at least one of: (a) receiving, by the processor, an authentication request including a CSR identifier associated with the CSR; (b) identifying, in the memory, a customer identifier using at least the CSR identifier; (c) transmitting an authentication response in response to the authentication request, the authentication response including at least the customer identifier; (d) storing, in the memory, a first record including the CSR identifier of the CSR and the customer identifier associated with a customer; (e) transmitting an access request to the interface system, the access request including at least the CSR identifier, wherein receiving an authentication request is a consequence of transmitting the access request; (f) cross-referencing the CSR identifier with the memory to identify the first record; (g) receiving a request to access the interface system as the customer initiated by the CSR through a customer support service (CSS) system; (h) providing the CSR a consumer experience associated with the customer identifier; (i) deleting the first record from the memory after identifying the customer identifier; (j) receiving an authentication request from a security token service; and (k) transmitting an authentication response to the security token service.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows® is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions in which a cardholder may participate in a loyalty rewards program. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2). Further, in some embodiments, interchange network 28 and/or issuer bank 30 stores in database 120 information associated with a loyalty program such as, for example, an amount of loyalty points associated with the cardholder and/or the transaction.

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, cardholder 22, merchant 24, merchant bank 26, interchange network 28 (also referred to herein as payment processor 28), issuer bank 30, and/or an issuer processor 21. In some cases, a rewards program may be offered to cardholders that use system 20. The rewards program may be offered and managed by one or more of merchant 24, interchange network 28, issuer 30, and issuer processor 21.

Figure 2:
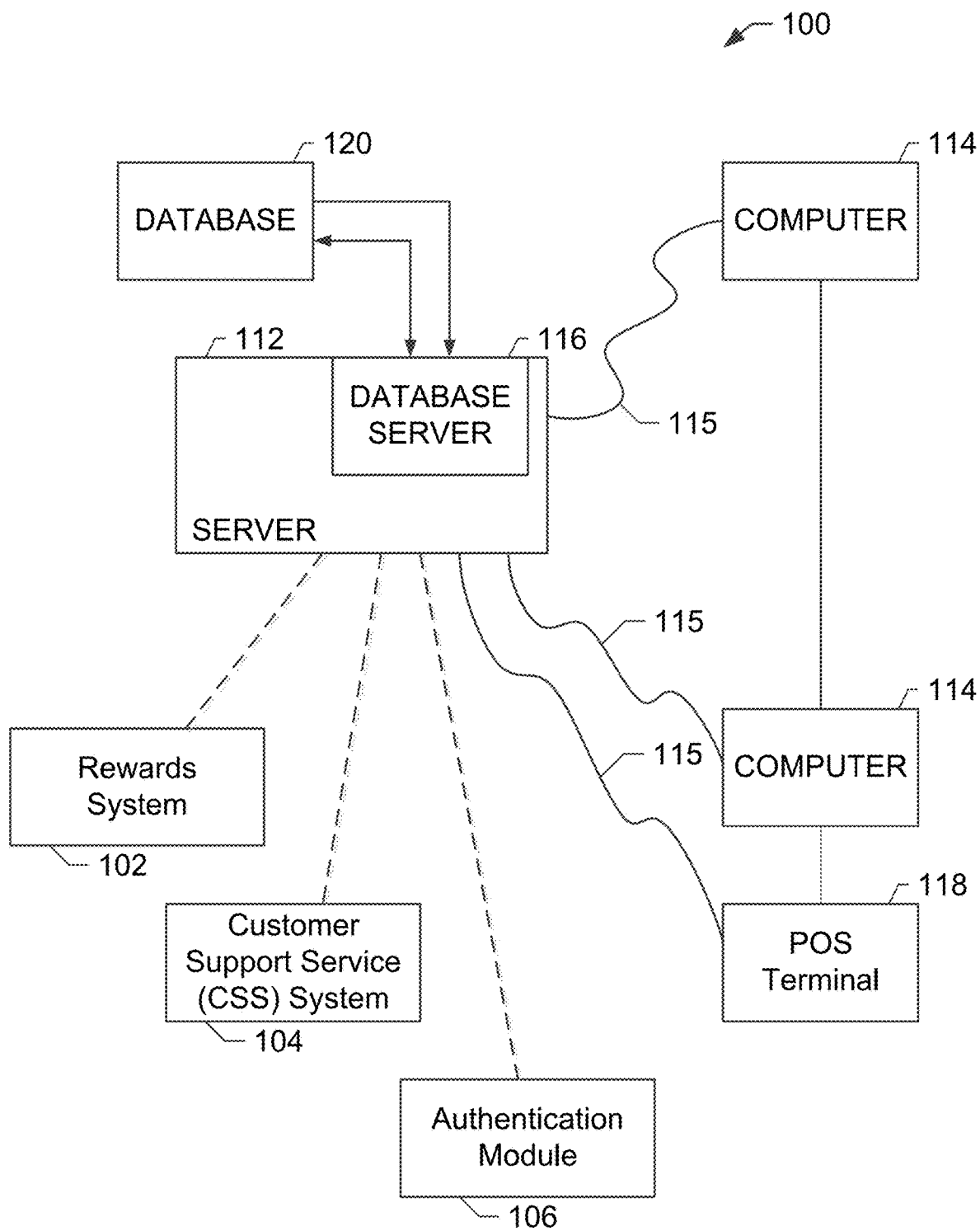

FIG. 2 is a simplified block diagram of an example computing system 100 for providing an interface system such as a loyalty rewards program to cardholders. System 100 includes a plurality of computer devices connected in communication in accordance with the present disclosure. In the example embodiment, system 100 may be used to provide a rewards management application (i.e., a customer interface system), a customer support services (CSS) application, a rewards tracking database, and/or an authentication module 110 associated with the loyalty program in the payment card environment shown in FIG. 1.

More specifically, in the example embodiment, system 100 includes a server system 112 in communication with a point-of-sale (POS) terminal 118 at a merchant location, such as merchant 24 (shown in FIG. 1), and/or other client systems 114 associated with merchants, merchant banks, payment networks, issuer banks, and/or cardholders.

In the example embodiment, server system 112 is also in communication with a plurality of client sub-systems, also referred to as client systems 114. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment. Client systems 114 may be used by cardholders to access the rewards system described herein. Further, client systems 114 may be used by customer services representatives (CSRs) to access the customer support services (CSS) system described herein.

In the example embodiment, system 100 also includes POS terminals 118, which may be connected to client systems 114 and may be connected to server system 112. POS terminals 118 may be interconnected to the Internet (or any other network that allows the POS terminals 118 to communicate as described herein) through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a cardholder's financial transaction card. In some embodiments, POS terminal 118 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store loyalty rewards information.

In the example embodiment, system 100 also includes a reward system 102, a consumer support services (CSS) system 104, and an authentication module 106. Reward system 102 enables cardholders to view and manage aspects of their loyalty program and/or loyalty account. CSS system 104 enables CSR's to support cardholders and the loyalty program. Authentication module 106 enables CSRs to cross-authenticate from CSS system 104 into rewards system 102 as a cardholder. In some embodiments, one or more of reward system 102, CSS system 104, and/or authentication module 106 are applications executed by server system 112. In other embodiments, one or more of reward system 102, CSS system 104, and/or authentication module 106 are executed by a separate computing device (not separately shown) that is communicatively coupled to server system 112.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28 or a payment processor. In the example embodiment, server system 112 is associated with a network interchange, such as interchange network 28, and may be referred to as an interchange computer system or a payment processing computing device. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

Figure 3:
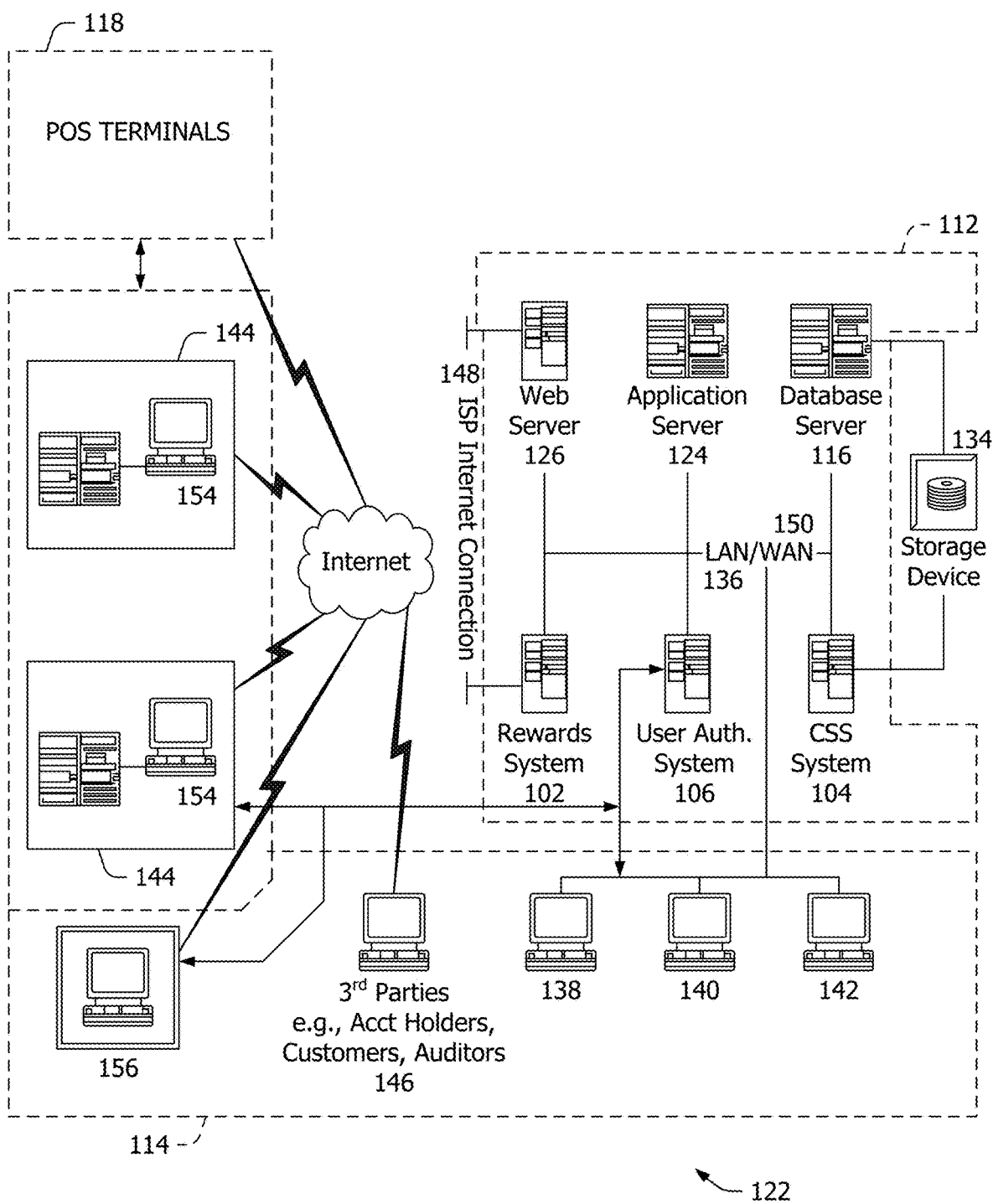

FIG. 3 is an expanded block diagram of an example embodiment of a server architecture of a loyalty rewards system 122 including other computer devices in accordance with one embodiment of the present disclosure. Components in system 122, identical to components of system 100 (shown in FIG. 2), are identified in FIG. 3 using the same reference numerals as used in FIG. 2. Loyalty rewards system 122 includes server system 112, client systems 114, and POS terminals 118. Server system 112 further includes database server 116, a rewards system 102, a web server 126, a user authentication system 106, a CSS system 104, and an application server 124. A storage device 134 is coupled to database server 116 and CSS system 104. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders (i.e., consumers), merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
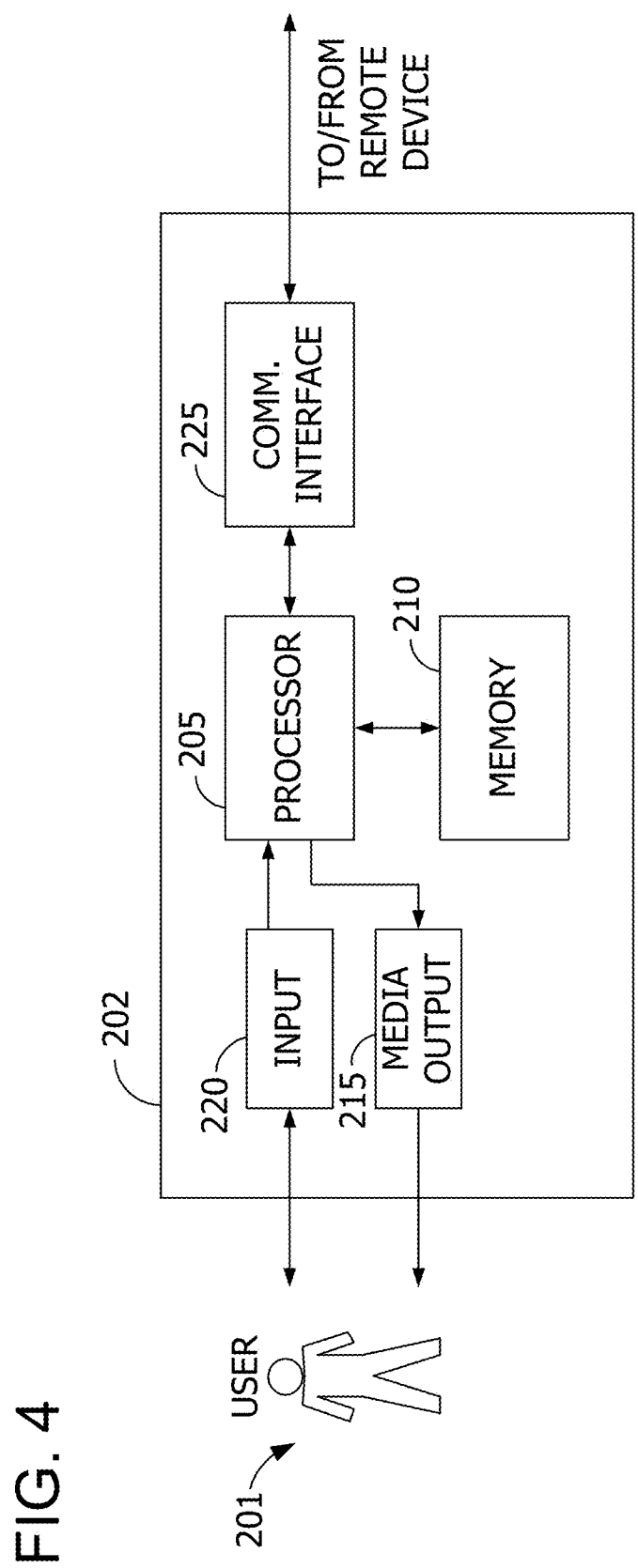
Figure 6:
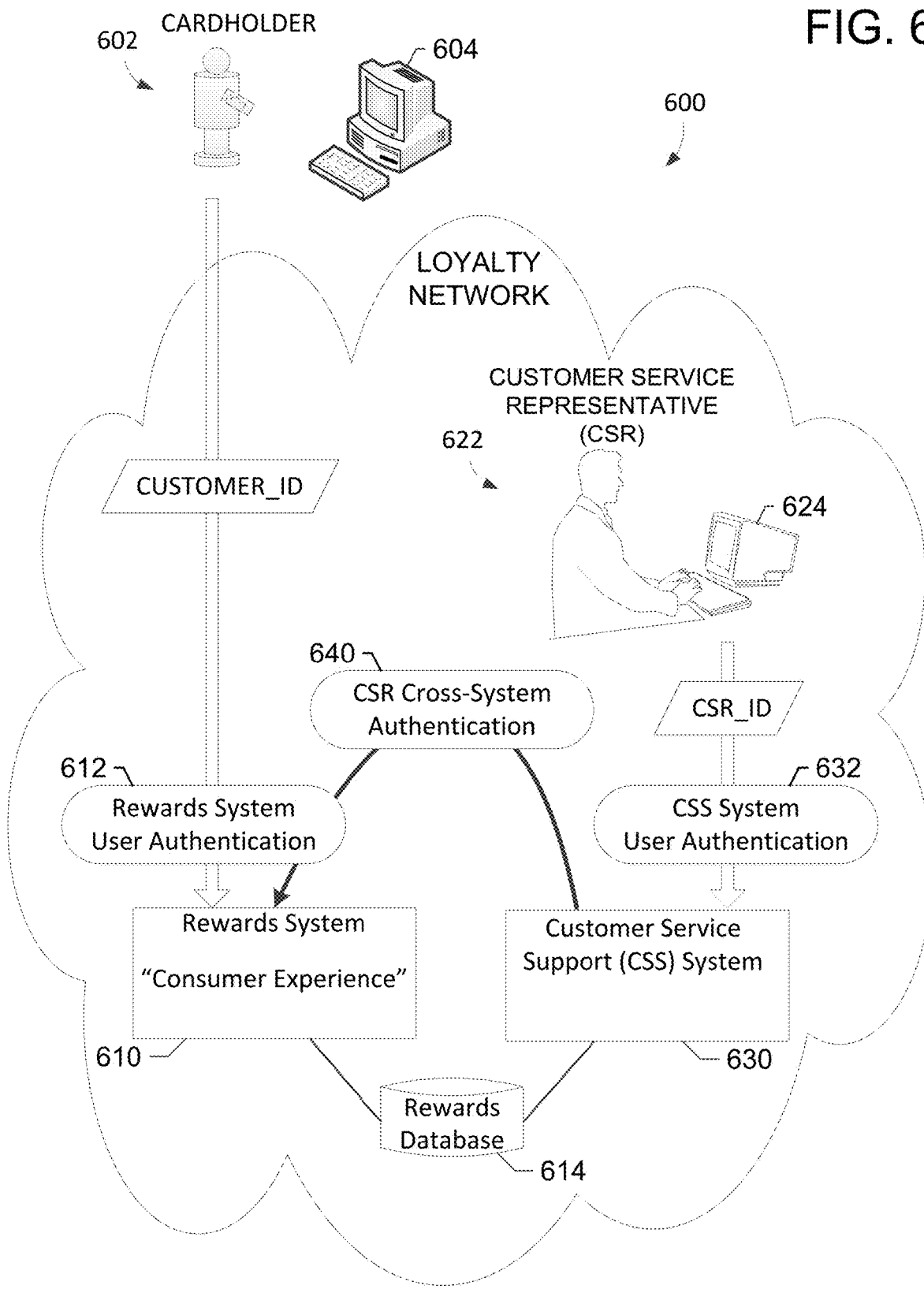

FIG. 4 illustrates an example configuration of a user system 202 operated by a user 201, such as cardholder 22 (shown in FIG. 1) and/or CSRs 622 (shown in FIG. 6). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
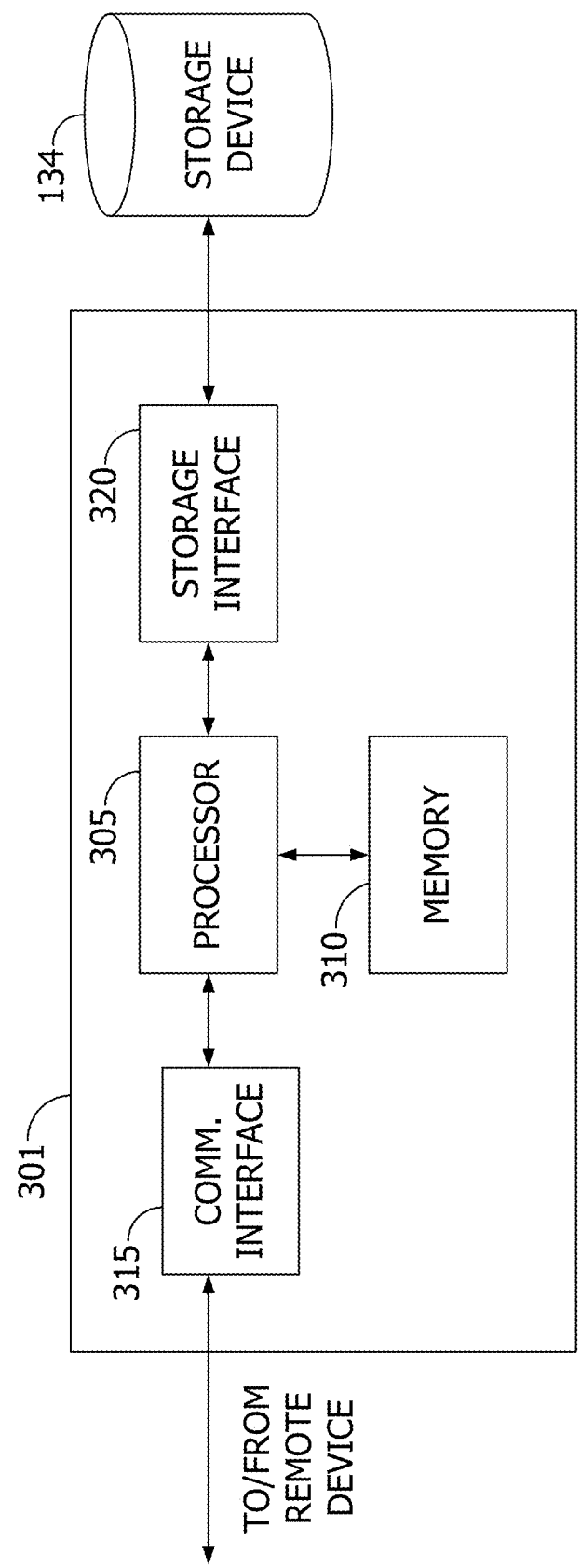

FIG. 5 illustrates an example configuration of a server system 301 such as server system 112 (shown in FIGS. 2 and 3). Server system 301 may include, but is not limited to, database server 116, application server 124, web server 126, rewards system 102, user authentication system 106, and CSS system 104 (all shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID)

configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

FIG. 6 is an example loyalty network environment 600 that may be implemented by loyalty rewards system 122 (shown in FIG. 3) in which a customer service representative (CSR) 622 may cross-authenticate into a customer environment (i.e., a customer interface system) to provide customer support. In the example embodiment, a cardholder 602 participates in a loyalty program offered by an issuing bank, a payment processor, and/or a merchant. As a part of the program, a rewards system 610 is provided. In some embodiments, rewards system 610 is similar to rewards system 102 (shown in FIGS. 2 and 3). The rewards system provides a suite of functionality associated with the loyalty program to the cardholder 602, such as, for example, viewing a status of the cardholder's currently accumulated loyalty points, viewing current offers extended to the cardholder, redeeming loyalty points for goods, services, travel, transfer loyalty points to other cardholders, manage communication preferences, configure rewards preferences, manage their household accounts, and view historical loyalty point earnings, redemptions, adjustments, and expiration details. These accumulated rewards and historical data may be stored in a rewards database 630, which in some embodiments is similar to database 120 (shown in FIG. 2).

In the example embodiment, cardholder 602 accesses rewards system 610 using a personal computing device 604 or mobile device. In some embodiments, computing device 604 is similar to user system 202 shown in FIG. 4. A rewards system user authenticator 612 provides an authentication mechanism for protecting confidential information and functionality of the rewards system 610 by authenticating incoming users such as cardholder 602. In some embodiments, this authentication process is a login process in which cardholder 602 provides a unique login name or account number (e.g., "CUSTOMER_ID") and a password known only to the cardholder, thereby both authenticating the particular cardholder and distinguishing the particular cardholder from others.

Once cardholder 602 has successfully authenticated through the rewards system user authenticator 612, rewards system 601 presents cardholder 602 with a "consumer experience." As used herein, the term "consumer experience" is used broadly to refer to the set of screens, the suite of functionality, and/or the particular benefits presented and available to cardholder 602 while he/she is logged into rewards system 610. For example, the consumer experience may include a web page displaying generic offers or advertisements for products or services. In the example embodiment, at least some of the consumer experience is tailored specifically for the particular user (e.g., the specific cardholder 602 identified by "CUSTOMER_ID"). For example, rewards system 610 may present cardholder 602 with a status page displaying the rewards and loyalty points accumulated for that particular cardholder (e.g., the benefits accrued to the cardholder's underlying payment card account), or a redemption page allowing cardholder 602 to accept offers or spend loyalty points. As such, rewards system 610 enables a different consumer experience depending on the login of the particular cardholder.

To support cardholders 602 and their use of rewards system 610, loyalty network 600 also provides a customer service support (CSS) system 630. In some embodiments, CSS system 630 is similar to CSS system 104 (shown in FIGS. 2 and 3). In the example embodiment, one or more customer service representatives (CSR's) 622 support cardholders 602 through, for example, a helpdesk phone number or an online helpdesk function. CSR 622 uses a computing device 624 to access CSS system 630. In some embodiments, computing device 624 is similar to user system 202.

In the example embodiment, to access CSS system 630, CSR 622 authenticates through a CSS system user authenticator 632. In some embodiments, CSS system user authenticator 632 is similar to rewards system user authenticator 612. For example, CSR 622 authenticates into CSS system 630 through authenticator 632 using a unique CSR ID (e.g., "CSR_ID") and an associated password, thereby both authenticating the particular CSR to CSS system 630, but also distinguishing CSR 622 from other CSRs that use CSS system 630.

CSS system 630, in the example embodiment, provides a suite of support functionality that enables CSR 622 to carry out support tasks associated with loyalty network 600. In some embodiments, CSS system 630 provides some of the same functionality that is available from rewards system 610. In other words, and for example, CSR 622 may be able to access rewards system 610 using his own ID or a support ID, and as such may be able to have a similar experience to that of cardholder 602, but not the same as cardholder 602 because CSR 622 authenticated using a different ID.

During operation, for example, CSR 622 receives a phone call from cardholder 602. Cardholder 602 may request help from CSR 622 with a particular operation associated with the loyalty program. However, in some embodiments, CSR may need to perform an operation that is not enabled by CSS system 630, or CSR may need to create a record of performing some task in the system on behalf of the user. For example, cardholder 602 may wish to participate in an offer, or spend loyalty points associated with their payment card account, but may not be able to access rewards system 610 and perform these operations themselves. In the example embodiment, this operation is a function available or enabled by the consumer experience (e.g., by rewards system 610), but not available or enabled by the customer service system (e.g., CSS system 630). In other words, CSR 622 may not be able to use CSS system 630 alone to help cardholder 602 perform the desired operation.

As such, in the example embodiment, a CSR cross-system authentication module 640 is provided as a part of loyalty network 600. In some embodiments, authentication module 640 is similar to authentication module 106 (shown in FIGS. 2 and 3). Authentication module 640 enables CSR 622 to cross-authenticate from one system to another (e.g., from CSS system 630 into rewards system 610). More specifically, in some embodiments, authentication module 640 allows CSR 622 to authenticate or "login" to rewards system 610 as the particular cardholder 602 that CSR 622 is currently supporting or working with. As such, CSR 622 is able to view and interact with rewards system 610 and the consumer experience as cardholder 602 would. In other words, CSR 622 can perform operations, view data, engage specific functionality, and otherwise interact with rewards system 610 with at least as much privileges as cardholder 602. A detailed example embodiment of cross-system authentication and an example authentication module are described further below, in reference to FIG. 7.

Figure 7:
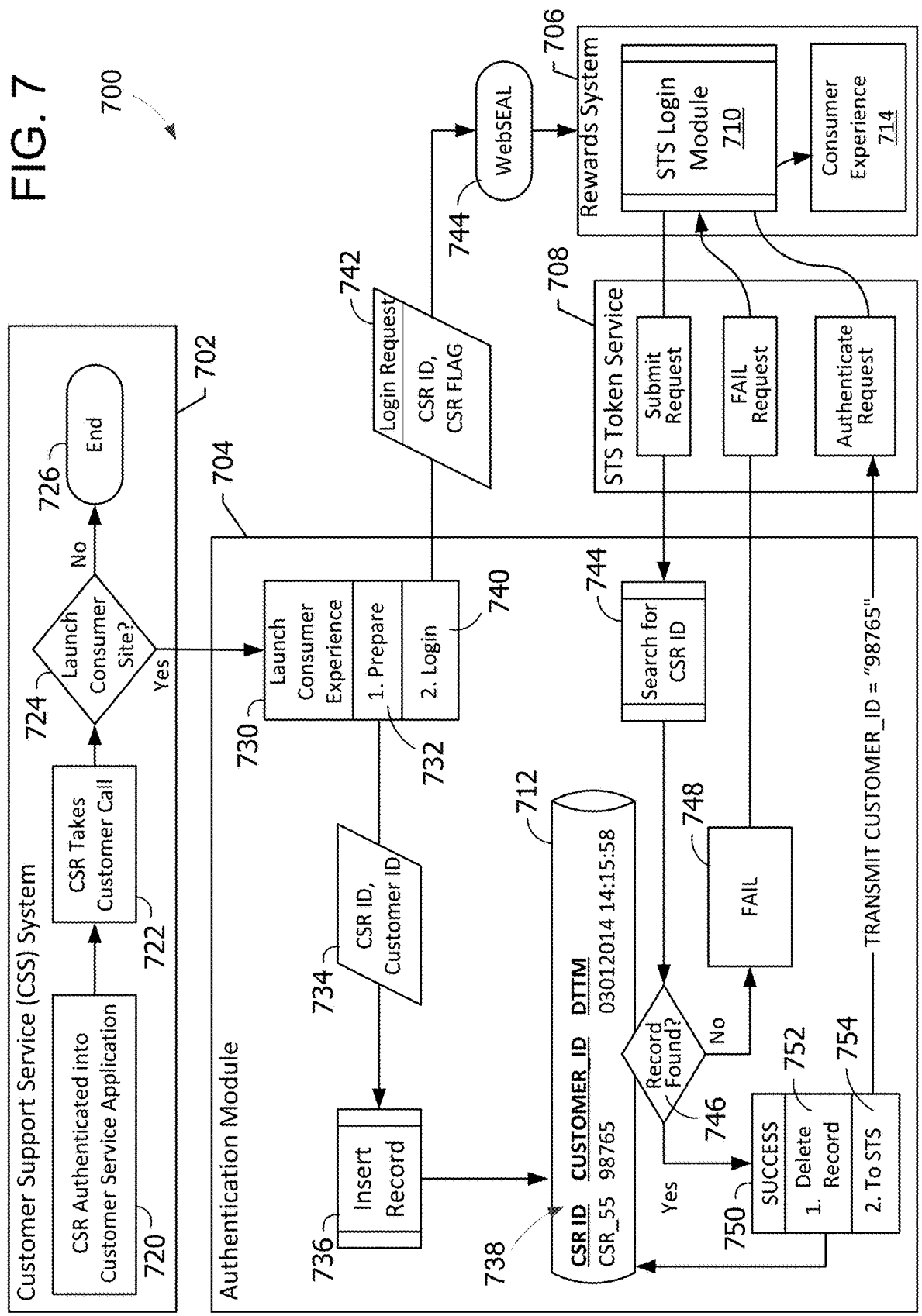

FIG. 7 is an example loyalty network 700 or system and method that may be used to provide a loyalty program to cardholders. Loyalty network 700 includes a customer support service (CSS) system 702, an authentication module 704, and a rewards system 706. In some embodiments, loyalty network 700 is similar to loyalty network 600 (shown in FIG. 6). Further, in some embodiments, CSS system 702 is similar to CSS system 630 (shown in FIG. 6) and/or CSS system 104 (shown in FIGS. 2 and 3). In some embodiments, rewards system 706 is similar to rewards system 610 (shown in FIG. 6) and/or rewards system 102 (shown in FIGS. 2 and 3). Additionally, in some embodiments, authentication module 704 is similar to authentication module 640 (shown in FIG. 6) and/or authentication module 106 (shown in FIGS. 2 and 4).

In the example embodiment, a CSR such as CSR 622 (shown in FIG. 6) authenticates 720 into CSS system 702 and into a customer service application. The CSR then engages with a particular customer, such as cardholder 602 (shown in FIG. 6) to, for example, support rewards system 706. In the example embodiment, the CSR receives a telephone call 722 from the cardholder and creates a case within CSS system 702. In the example embodiment, each CSR has a unique ID associated with themselves (e.g., a "CSR_ID"), and each customer (e.g., cardholder) has a unique ID associated with themselves (e.g., a "CUSTOMER_ID"). In the example shown in FIG. 7, the CSR identified as "CSR_55" is supporting a cardholder identified as "98765". In some embodiments, CSS system 702 identifies the CSR as "CSR_55" based on the active username used during the initial authentication 720 of the CSR into CSS system 702. Further, CSS system 702 identifies the particular customer as cardholder "98765" during the call (e.g., the CSR may authenticate the caller as a normal security practice during the call, or for purposes of identifying their underlying rewards or payment card account, or for any other purpose).

While working the case, CSS system 702 presents an option to the CSR to launch 724 a consumer experience 714 (e.g., start an interactive session with rewards system 706 as the cardholder). For example, CSS system 702 may present a button, a function key, or a menu item that will start a process to launch the consumer experience 714. If 724 the CSR does not activate the launch process, then the CSR and CSS system 702 performs other duties completes 726 the customer call (e.g., without use of the consumer experience).

In the example embodiment, the CSR launches 724 the consumer experience. CSS system 702 then engages authentication module 704 to begin the launch. At step 730, authentication module 704 performs two steps.

First, authentication module prepares 732 the cross-over authentication of the CSR. To prepare 732 the cross-over authentication, authentication module 704 sends 734 the CSR_ID and CUSTOMER_ID of the present call (e.g., "CSR_55" and "98765", respectively) to be inserted 736 into a database 712. In some embodiments, database 712 is similar to database 120 shown in FIG. 2. In the example embodiment, database 712 includes relational database management software (RDBMS) (e.g., database server 116 shown in FIGS. 2 and 3), and a row is inserted into a customer mapping table 738 by the RDBMS. In one embodiment, the customer mapping table 738 includes a column for CSR_ID, a column for CUSTOMER_ID, and a third column for a timestamp. The insert 736 creates a row in database 712 that associated CSR "CSR_55" with the customer they are currently supporting, cardholder "98765". In some embodiments, authentication module 704 searches for a pre-existing row in database 120 having the CSR_ID of the CSR (e.g., "CSR_55"). If a row exists, the row may be considered abandoned (e.g., from a prior call involving CSR_55), whether or not the accompanying CUSTOMER_ID matches the customer whom the CSR is currently supporting (e.g., customer 98765). Accordingly, authentication module 704 may delete the abandoned row prior to inserting the new row, or replace the pre-existing row data with the new data. This step provides enhanced security by removing any row entries that are no longer needed by the CSR.

Next, authentication module 704 initiates a login 740 to rewards system 706. More specifically, in the example embodiment, login 740 includes a login request 742 with at least the CSR_ID (e.g., "CSR_55") sent to an STS login module 710 associated with rewards system 706. STS login module 710 communicates with an STS ("Security Token Service") token service 708 to provide at least some user authentication services for reward system 706. STS token service 708 is a security token service that performs user authentication and issues security tokens, including software tokens, as part of a claims-based identity system. In some embodiments, STS token service 708 is a service of STS login module 710. In response to login request 742, STS login module 710 initiates an authentication request with STS token service 708. The request is initiated with the CSR's ID (e.g., "CSR_55"), as well as a flag indicating that the login request is initiated by a CSR. In some embodiments, IBM® Tivoli® Access Manager (TAM) and Tivoli® Federated Identity Manager (FIM) Security Token Service (STS) are used. An IVCred persists in an application header between the CSS application (e.g., CSS system 702) during the outbound request to WebSEAL 744. The IVCred contains the CSR's B2C (business-to-consumer) identity as well as other information regarding the CSR's authenticated session. STS token service 708 leverages the IVCred in order to retrieve the data necessary to generate a SAML (Security Assertion Markup Language) assertion for authenticating the CSR to Rewards System 706. The flag may be a custom configuration within STS login module 710, and may be used to prevent other servers hosting rewards system 706 from accepting this type of authentication. In some embodiments, the flag may be set by STS login module 710 when converting the IVCred to SAML.

In the example embodiment, STS token service 708 submits the login request to authentication module 704. In some embodiments, operation 733 may be requested by STS Token Service 708 (client) as a Web Service request. The Web Services logic (provider) may be used, for example, to perform operations 744, 746, 750, 752, and/or 748. In the example embodiment, authentication module 704 searches 744 the database 712 (e.g., customer mapping table 738) for an entry for the given CSR (e.g., "CSR_55"). If 746 no record is found (e.g., if there is no record of this CSR working with a customer), then the login request is denied or failed 748. This failure notification is passed back through STS token service 708 to STS login module 710.

In some embodiments, if 746 a record is found, but the record is stale (i.e., too old), then authentication module 704 will also fail 748 the authentication request. To determine whether the record is stale, in some embodiments, the DTTM time of the record is compared to a current time, or a time of the initiation of the request. If the difference in time exceeds a predetermined threshold such as, for example, 15 minutes, then the record is deemed stale. Further, in some embodiments, upon detection, this stale record may be deleted from database 712. This feature enables authentication module 704 to distinguish between a recent request (e.g., a CSR currently working a case with a customer) and a historic artifact (e.g., a remnant from a past call that is likely too old to support the authenticity of the current request), and may be used for troubleshooting issues with authentication between authentication module 704 and rewards system 706, or for tracking abandonments.

If 746 a record is found in database 712, then the login request will be authenticated as successful 750 by authentication module 704. To complete a successful authentication 750, in some embodiments, authentication module 704 deletes 752 the record from database 712. This feature acts as a security measure, providing each launch 730 of the consumer experience only one successful authentication 750 (e.g., "one-time use").

In the example embodiment, to complete a successful authentication 750, authentication module 704 transmits a success response 754 to STS token service 708. More specifically, the success response 754 enables STS token service 708 to have a complete data set for STS login module 710. In other words, authentication module 704 responds to the login request not under the CSR's ID, but rather as the CUSTOMER_ID from the located row in database 712 and, in the present example, the user is authenticated as the identity of "98765" (e.g., the cardholder who opened the associated support call, and whose ID is stored in the CUSTOMER_ID field of the mapping table 738). In some embodiments, authentication module 704 transmits one or more of a principal user ID token, the CSR flag, an application proprietary ID, and an enterprise site ID.

In response to the authentication 754 acknowledgment from authentication module 704, STS token service 708 generates and returns a token to STS login module 710. In some embodiments, the primary credentials in the SAML persist as the CSR's identity. When the CSR flat is set in the affirmative, the application proprietary ID value is the CUSTOMER_ID retrieved from customer mapping table 738.

In the example embodiment, upon receipt of the authentication token from STS token service 708, the CSR (e.g., CSR_55) is logged into the rewards system 706 under the identity of the customer (e.g., cardholder "98765"). As such, the CSR is presented with consumer experience 714 similar to what the customer would see, and with at least the set of functionality that the customer would encounter.

In some embodiments, one or more of CSS system 702, authentication module 704, and rewards system 706 logs the CSR's access to rewards system 706 as the customer. For example, in one embodiment, authentication module 704 creates a record of successful 750 and failed 748 authentication requests, as well as associated information such as the requesting CSR_ID, the CUSTOMER_ID associated with the request, a date/time stamp of the request, and a final disposition status (e.g., success or failure) of the request. In another embodiment, rewards system 706 tracks data associated with any audited actions such as, for example, redeeming loyalty points for a product or service, transferring points, or updating customer information.

While the example embodiment shown in FIG. 7 illustrates authentication module 704 as a separate system or actor, it should be understood that the functions performed by authentication module may be performed by or integrated into any system affiliated with the loyalty program such as CSS system 702, rewards system 706, or STS token service 708. Further, the various functions performed by authentication module 704 may, in some embodiments, be separated and performed by different systems. For example, in some embodiments, CSS system 702 may perform the preparation 732 thread of processing, while another system may perform the authentication thread of processing (e.g., search 744 through failure 748 or success 754).

Figure 8:
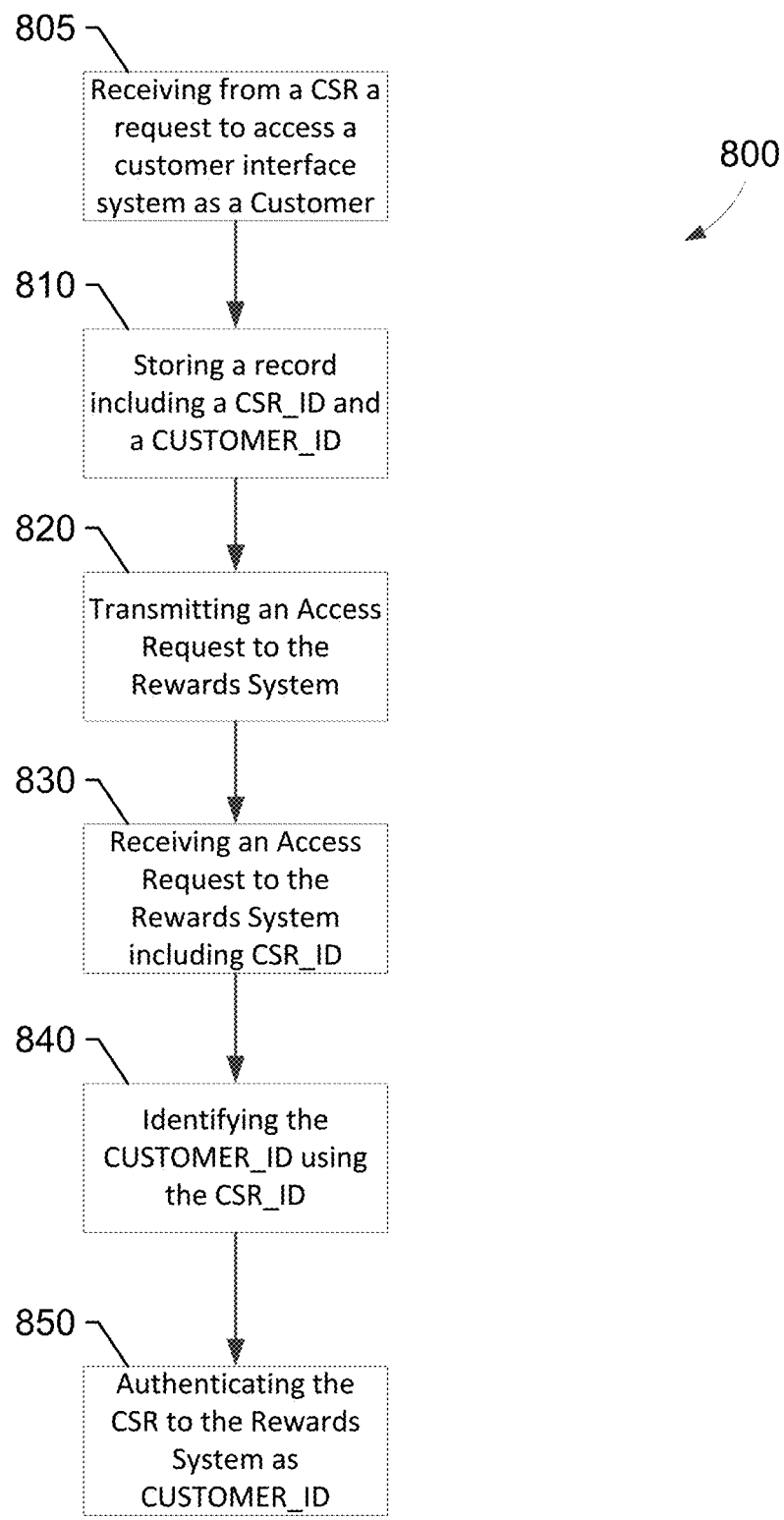

FIG. 8 is an example method 800 for providing a customer service representative (CSR) access to an interface system such as rewards system 706 (shown in FIG. 7). In the example embodiment, method 800 is performed by one or more computing systems such as server 112 (shown in FIG. 2), loyalty rewards system 122 (shown in FIG. 3), or by computing device 910 (shown in FIG. 9). In some embodiments, method 800 includes receiving 805 a request to access an interface system, such as rewards system 706 (shown in FIG. 7). This request, in some embodiments, is initiated by a CSR through a customer support service (CSS) system (e.g., CSS 702 (shown in FIG. 7), where the CSR requests access to the interface system as a particular customer (e.g., having CUSTOMER_ID).

Method 800, in some embodiments, includes storing 810 a first record, for example in a database such as database 712 (shown in FIG. 7). The record includes a CSR identifier of the CSR (e.g., CSR_ID) and the customer identifier associated with a customer (e.g., CUSTOMER_ID). Further, method 800 may also include transmitting 820 an access request such as login request 742 to an interface system. The access request includes at least the CSR identifier. Further, in some embodiments, transmitting 820 an access request precipitates receiving 830 an authentication request (i.e., receiving 830 is a consequence of transmitting 820). Receiving 830 an authentication request may include receiving an authentication request from, for example, rewards system 706. The authentication request includes a CSR identifier associated with the CSR. In some embodiments, receiving 830 an authentication request further includes receiving an authentication request from a security token service.

In the example embodiment, method 800 also includes identifying 840 a customer identifier using at least the CSR identifier. For example, in some embodiments, the CSR identifier is used to search in database 712 to identify a record that includes both the CSR identifier and a corresponding customer identifier. Method 800 also includes transmitting 850 an authentication response in response to the authentication request. The authentication response includes at least the customer identifier. In some embodiments, transmitting 850 the authentication response further includes transmitting an authentication response to the security token service. In some embodiments, transmitting 850 the authentication response includes authenticating the CSR (e.g., the login request) as the customer (e.g., CUSTOMER_ID) to the interface system. Further, in some embodiments, after authentication of the CSR as the customer, method 800 includes providing the CSR a consumer experience associated with the customer identifier. In other embodiments, method 800 may include deleting the record from the database after identifying 840 or authenticating 850.

Figure 9:
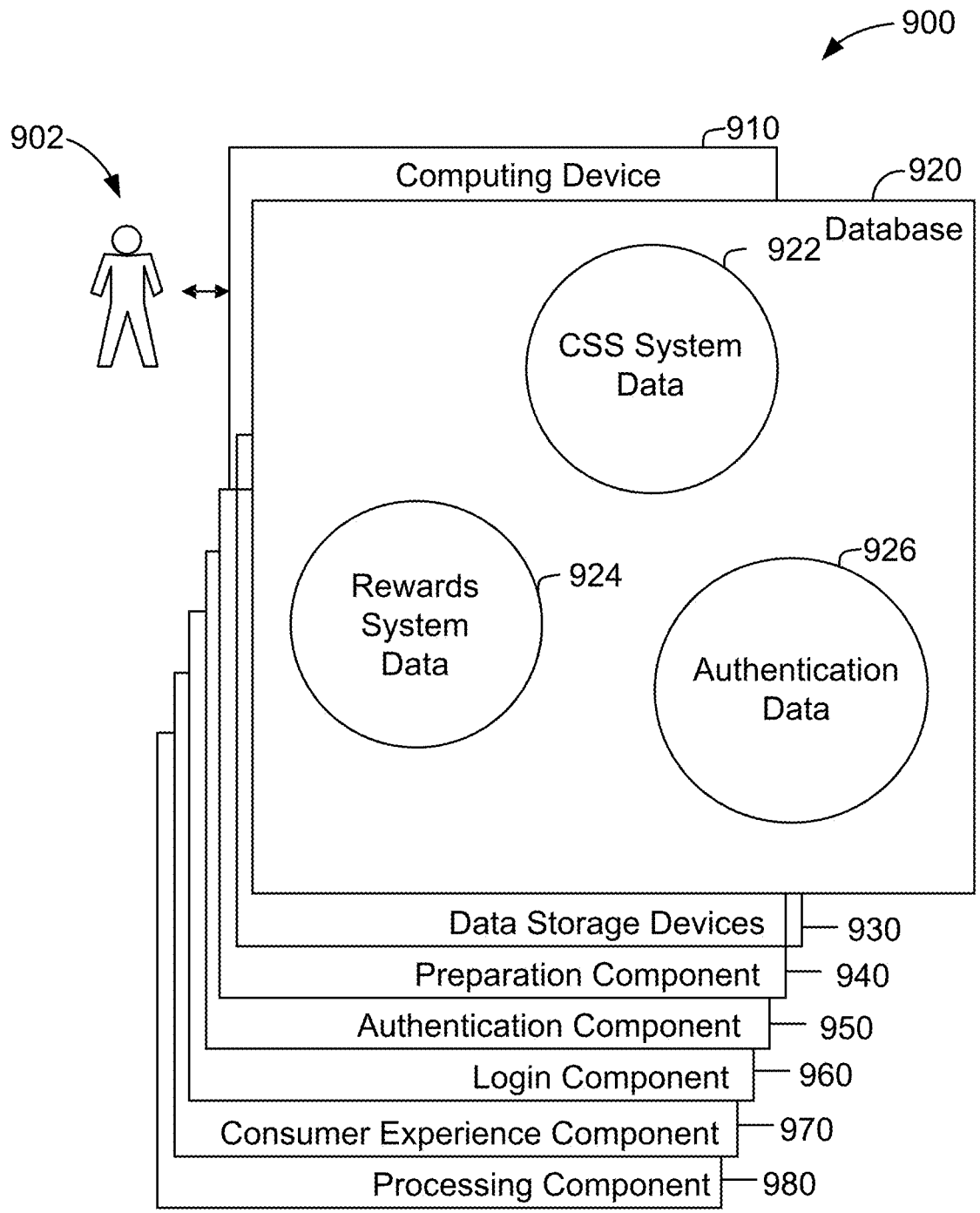

FIG. 9 shows an example configuration 900 of a database 920 within a computing device 910, along with other related computing components, that may be used to cross-authenticate a CSR 902 from a CSS system (e.g., CSS system 702 shown in FIG. 7) into a rewards system (e.g., rewards system 706 shown in FIG. 7) as a particular customer. In some embodiments, computing device 910 is similar to server system 112 (shown in FIG. 2), loyalty rewards system 122 (shown in FIG. 3), and/or server system 301 (shown in FIG. 5). Database 920 is coupled to several separate components within computing device 910, which perform specific tasks.

In the example embodiment, database 920 includes CSS system data 922, rewards system data 924, and authentication data 926. In some embodiments, database 920 is similar to database 120 (shown in FIG. 2), rewards database 614 (shown in FIG. 6), and/or database 712 (shown in FIG. 7). CSS system data 922 includes information associated with authenticating CSRs into a CSS system, and application data associated with managing customer support incidents. Rewards system data 924 includes information associated with a loyalty rewards program, such as records for offers and loyalty points associated with a plurality of cardholders. Authentication data 926 includes data associated with authentication of CSRs into a rewards system, such as the customer mapping table 738 shown in FIG. 7.

Computing device 910 includes the database 920, as well as data storage devices 930. Computing device 910 also includes a preparation component 940 for preparing the launch 730 of the cross-over authentication (shown and described in reference to FIG. 7). Computing device 910 also includes an authentication component 950 for searching authentication data 926 and failing 748 or authenticating 750 cross-over login requests. A login component 960 is also included for receiving login requests from preparation component 940 and submitting authentication requests to authentication component 950. A consumer experience component 970 provides both customers and CSRs a suite of functionality for interacting with the loyalty program. A processing component 980 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is a flexible system for communicating liability acceptance for payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for providing access to a rewards system for a customer service representative (CSR) via a customer support service (CSS) computer system, the rewards system configured to execute an Internet-accessible consumer experience application via a user computing device in response to a log-in of a customer through the user computing device, the method implemented using an authentication computing device including a processor and a mapping database, the authentication computing device in communication with the CSS computer system, said method comprising:

receiving, by the authentication computing device, a CSR identifier that identifies the CSR;

receiving, by the authentication computing device, a customer identifier that identifies the customer interacting with the CSR, the customer having a previously established customer rewards account for the rewards system and a customer password for logging in to the consumer experience application, wherein the consumer experience application is customizable by the logged-in customer via the user computing device;

associating the CSR identifier with the customer identifier;

storing, in the mapping database of the authentication computing device, a first record including the CSR identifier, the customer identifier, and a timestamp;

receiving, by the processor, from the rewards system, an authentication request including an input CSR identifier input by the CSR, wherein the rewards system transmits the authentication request in response to the authentication computing device initiating a login on behalf of the CSR to the rewards system;

identifying, in the mapping database of the authentication computing device, the first record by matching the input CSR identifier to the CSR identifier in the first record;

determining, using the first record, the customer identifier that corresponds to the CSR identifier;

transmitting an authentication response to the rewards system in response to the authentication request, the authentication response including at least the customer identifier, wherein the authentication response causes the rewards system to log the CSR into the consumer experience application under the customer identifier on the rewards system, whereby the CSR log-in grants access by the CSR to the consumer experience application associated with the previously established customer rewards account on the rewards system, without the rewards system receiving the customer password and without the CSR receiving the customer password for the previously established customer rewards account on the rewards system, thereby providing the CSR access to the consumer experience application as customized by the customer and to a set of customer functionalities available to the customer via the consumer experience application on the rewards system while maintaining security of the customer password;

receiving, by the processor, a request from the CSR to execute at least one of the set of customer functionalities of the customer rewards account;

updating, by the processor and in response to receiving the request from the CSR, data in the customer rewards account;

generating a log entry associated with the CSR login to the rewards system, the log entry including the CSR identifier and the customer identifier; and storing the generated log entry.

2. The method of claim 1 further comprising:

transmitting an access request to the rewards system to initiate the login, the access request including at least the CSR identifier, wherein receiving an authentication request is a consequence of transmitting the access request.

3. The method of claim 1 further comprising receiving, from the CSS system, a request to access the rewards system as the customer.

4. The method of claim 1 further comprising deleting the first record from the mapping database of the authentication computing device after determining the customer identifier.

5. The method of claim 1, wherein receiving an authentication request further includes receiving the authentication request from a security token service, wherein transmitting the authentication response further includes transmitting the authentication response to the security token service, the security token service forwarding the authentication response to the rewards system.

6. The method of claim 1, wherein receiving a customer identifier comprises receiving an account identifier of the customer rewards account.

7. The method of claim 1, wherein the method further comprises causing the rewards system to generate the exact same experience as that of the customer, enabling the CSR to perform at least one operation on behalf of the customer, the at least one operation including at least one of viewing accumulated loyalty points, viewing accumulated offers, and spending loyalty points.

8. The method of claim 1, wherein receiving the authentication request comprises receiving the authentication request via a security token service (STS) coupled between the authentication computing device and the rewards system, and wherein transmitting an authentication response comprises transmitting the authentication response via the STS, the authentication response causing the STS to generate a security token and transmit the security token to the rewards system to cause the rewards system to log the CSR into the customer rewards account.

9. The method of claim 1, wherein the set of customer functionalities includes at least one of redeeming loyalty points for a product or service, transferring points, and updating customer information.

10. An authentication computing device for providing a customer service representative (CSR) access to a rewards system via a customer support service (CSS) computer system, the rewards system configured to execute an Internet-accessible consumer experience application via a user computing device in response to a log-in of a customer through the user computing device, the authentication computing device in communication with the CSS computer system, said authentication computing device comprising a processor communicatively coupled to a mapping database, said authentication computing device programmed to:

receive a CSR identifier that identifies the CSR;

receive a customer identifier that identifies the customer interacting with the CSR, the customer having a previously established customer rewards account for the rewards system and a customer password for logging in to the consumer experience application, wherein the consumer experience application is customizable by the logged-in customer via the user computing device;

associate the CSR identifier with the customer identifier;

store, in the mapping database, a first record including the CSR identifier, the customer identifier, and a timestamp;

receive, from the rewards system, an authentication request including an input CSR identifier input by the CSR, wherein the rewards system transmits the authentication request in response to said authentication computing device initiating a login on behalf of the CSR to the rewards system;

identify, in the mapping database, the first record by matching the input CSR identifier to the CSR identifier in the first record;

determine, using the first record, the customer identifier that corresponds to the CSR identifier; and transmit an authentication response to the rewards system in response to the authentication request, the authentication response including at least the customer identifier, wherein the authentication response causes the rewards system to log the CSR into the consumer experience application under the customer identifier on the rewards system, whereby the CSR log-in grants access by the CSR to the consumer experience application associated with the previously established customer rewards account on the rewards system, without the rewards system receiving the customer password and without the CSR receiving the customer password for the previously established customer rewards account on the rewards system, thereby providing the CSR access to the consumer experience application as customized by the customer and to a set of customer functionalities available to the customer via the consumer experience application on the rewards system while maintaining security of the customer password;

receive a request from the CSR to execute at least one of the set of customer functionalities of the customer rewards account;

update, in response to receiving the request from the CSR, data in the customer rewards account;

generate a log entry associated with the CSR login to the rewards system, the log entry including the CSR identifier and the customer identifier; and store the generated log entry.

11. The authentication computing device of claim 10, wherein said authentication computing device is further programmed to:

transmit an access request to the rewards system to initiate the login, the access request including at least the CSR identifier, wherein receiving an authentication request is a consequence of transmitting the access request.

12. The authentication computing device of claim 10, wherein said authentication computing device is further programmed to receive, from the CSS system, a request to access the rewards system as the customer.

13. The authentication computing device of claim 10, wherein said authentication computing device is further programmed to delete the first record from the mapping database after determining the customer identifier.

14. The authentication computing device of claim 10, wherein to receive the authentication request, the authentication computing device is configured to receive the authentication request from a security token service, and wherein to transmit an authentication response further includes transmitting the authentication response, the authentication computing device is configured to transmit to the security token service, the security token service forwarding the authentication response to the rewards system.

15. At least one non-transitory computer-readable storage media having computer-executable instructions embodied thereon for providing a customer service representative (CSR) access to a rewards system via a customer support service (CSS) computer system, the rewards system configured to execute an Internet-accessible consumer experience application via a user computing device in response to a log-in of a customer through the user computing device, wherein when executed by at least one processor of an authentication computing device in communication with the CSS computer system, the computer-executable instructions cause the processor to:
- receive, by the authentication computing device, a CSR identifier that identifies the CSR;
- receive, by the authentication computing device, a customer identifier that identifies the customer interacting with the CSR, the customer having a previously established customer rewards account for the rewards system and a customer password for logging in to the consumer experience application, wherein the consumer experience application is customizable by the logged-in customer via the user computing device;
- associate the CSR identifier with the customer identifier;
- store, in a mapping database of the authentication computing device, a first record including the CSR identifier, the customer identifier, and a timestamp;
- receive, by the processor, from the rewards system, an authentication request including an input CSR identifier inputted by the CSR, wherein the rewards system transmits the authentication request in response to the authentication computing device initiating a login on behalf of the CSR to the rewards system;
- identify, in the of the authentication computing device, the first record by matching the input CSR identifier to the CSR identifier in the first;
- determine, using the first record, the customer identifier that corresponds to the CSR identifier;
- transmit an authentication response to the rewards system in response to the authentication request, the authentication response including at least the customer identifier, wherein the authentication response causes the rewards system to log the CSR into the consumer experience application under the customer identifier on the rewards system, whereby the CSR log-in grants access by the CSR to the consumer experience application associated with the previously established customer rewards account on the rewards system, without the rewards system receiving the customer password and without the CSR receiving the customer password for the previously established customer rewards account on the rewards system, thereby providing the CSR access to the consumer experience application as customized by the customer and to a set of customer functionalities available to the customer via the consumer experience application on the rewards system while maintaining security of the customer password;
- receive a request from the CSR to execute at least one of the set of customer functionalities of the customer rewards account;
- update, in response to receiving the request from the CSR, data in the customer rewards account;
- generate a log entry associated with the CSR login to the rewards system, the log entry including the CSR identifier and the customer identifier; and
- store the generated log entry.

16. The computer-readable storage media of claim 15, wherein the computer-executable instructions further cause the processor to:
transmit an access request to the rewards system to initiate the login, the access request including at least the CSR identifier, wherein receiving an authentication request is a consequence of transmitting the access request.

17. The computer-readable storage media of claim 15, wherein the computer-executable instructions further cause the processor to receive, from the CSS system, a request to access the rewards system as the customer.

18. The computer-readable storage media of claim 15, wherein the computer-executable instructions further cause the processor to delete the first record from the mapping database of the authentication computing device after determining the customer identifier.

19. The computer-readable storage media of claim 15, wherein to receive an authentication request, the computer-executable instructions cause the processor to receive the authentication request from a security token service, and wherein to transmit an authentication response, the computer-executable instructions cause the processor to transmit the authentication response to the security token service, the security token service forwarding the authentication response to the rewards system.

* * * * *